Sept. 20, 1971          G. E. CALVERT          3,606,214
                            AIRFOIL
Filed Oct. 8, 1969                          4 Sheets-Sheet 1

INVENTOR
GALEN E. CALVERT
BY Cushman Darby & Cushman
ATTORNEYS

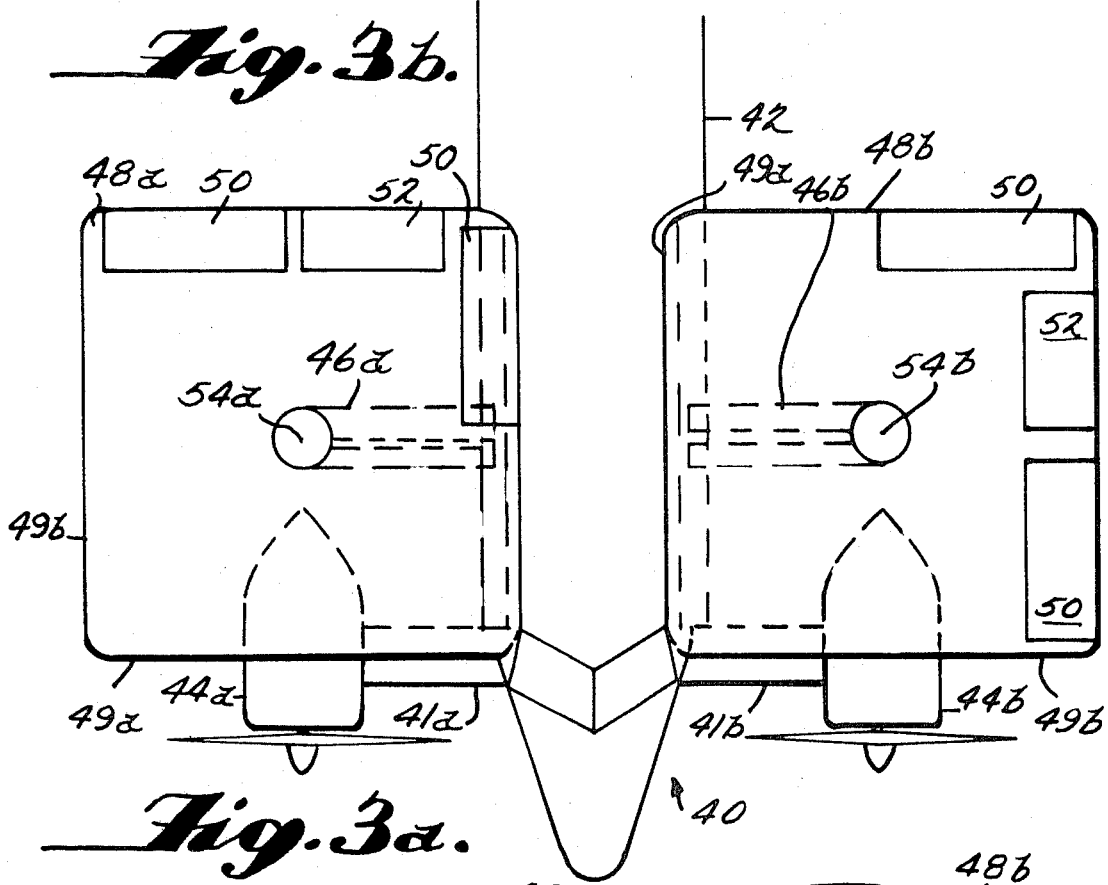

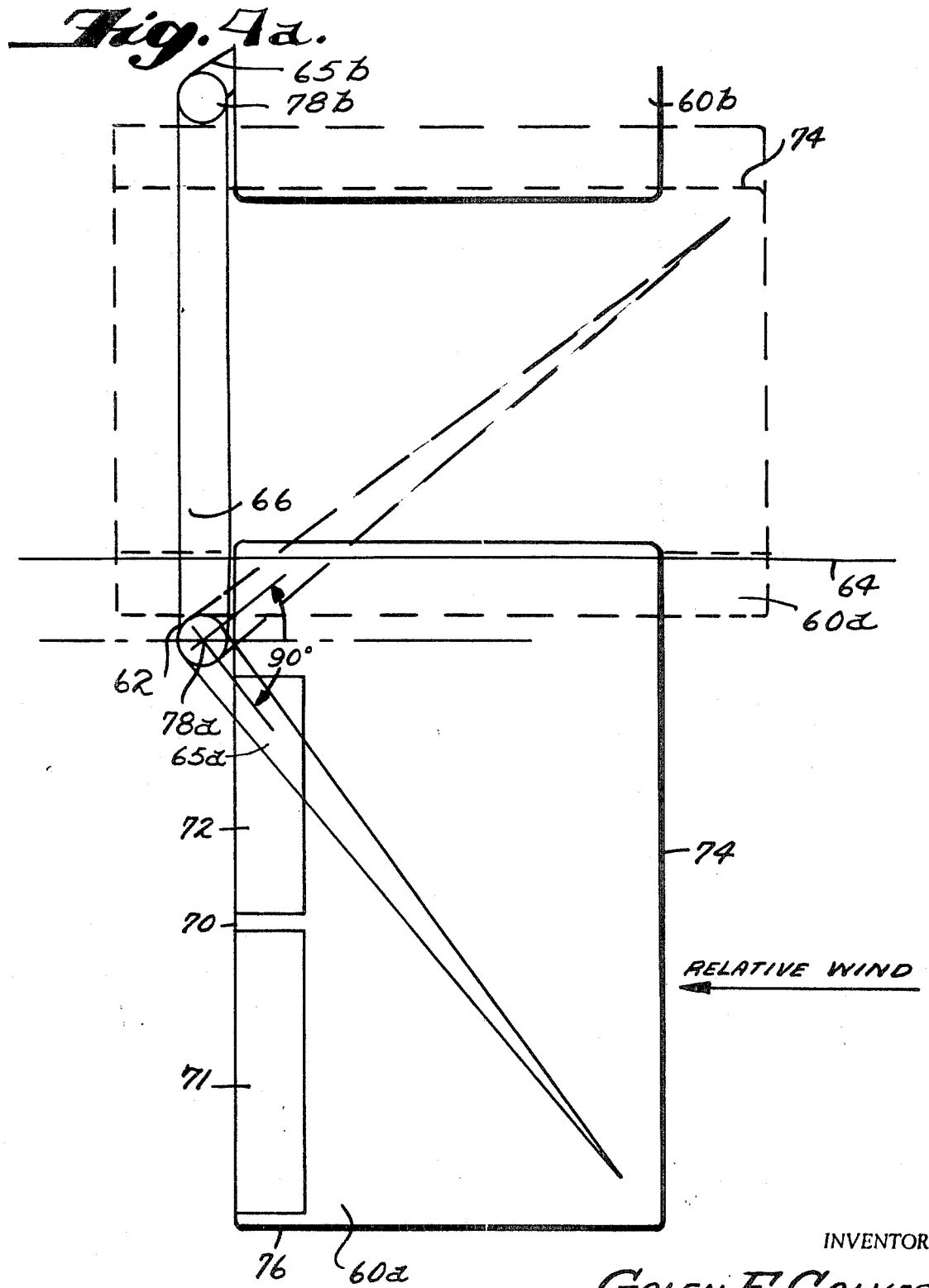

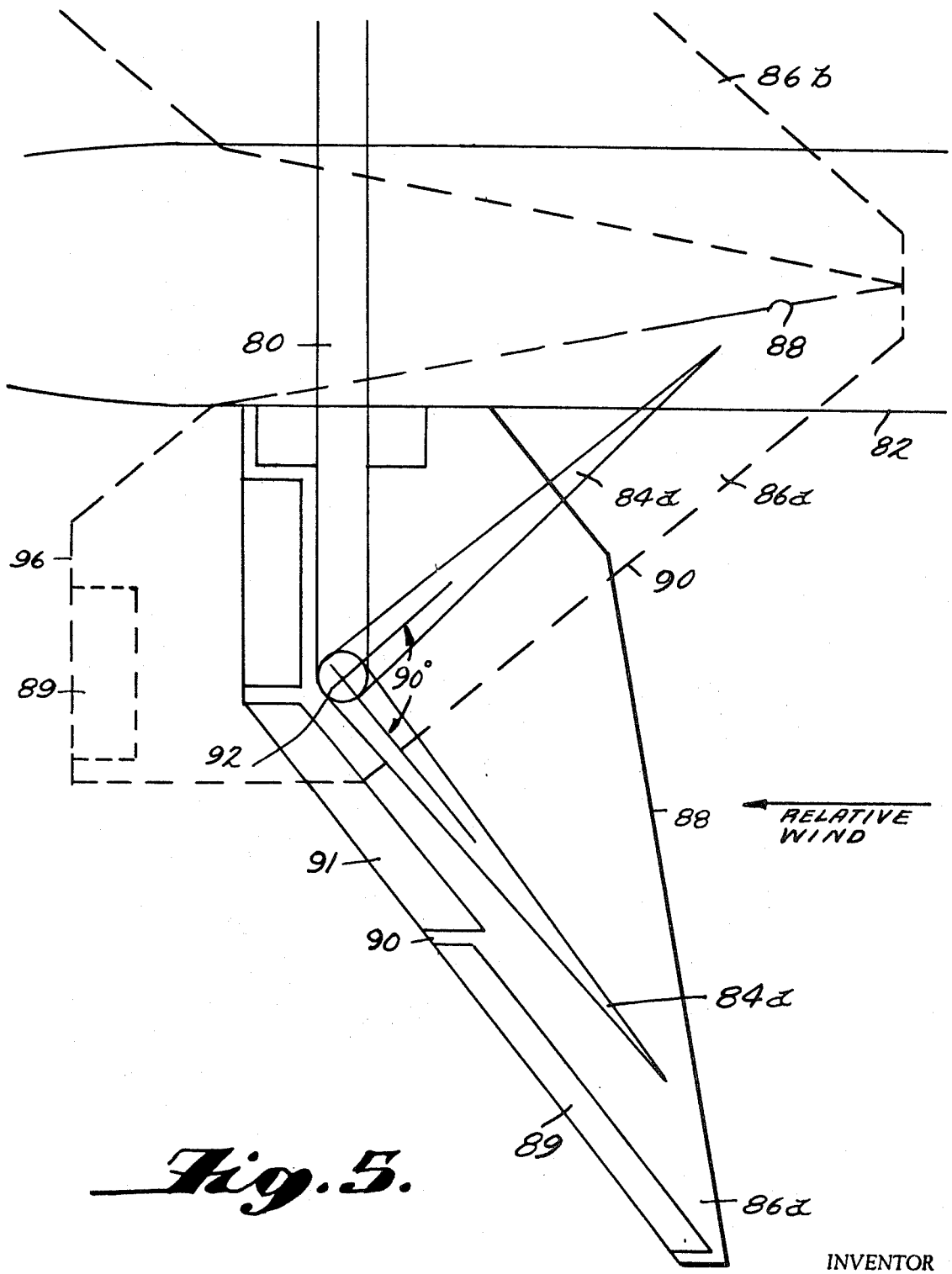

United States Patent Office 3,606,214
Patented Sept. 20, 1971

3,606,214
AIRFOIL
Galen E. Calvert, 7540 Beluga,
Anchorage, Alaska 99504
Filed Oct. 8, 1969, Ser. No. 864,859
Int. Cl. B64c 3/44, 3/54
U.S. Cl. 244—4.3
16 Claims

ABSTRACT OF THE DISCLOSURE

An airfoil construction is described in which the flight characteristic of the airfoil is changed by rotating same to present a different leading edge to the relative wind. One disclosed embodiment is constructed as to permit the rotation to occur by means of a change in attitude of the aircraft. The other disclosed embodiments provide for mechanical rotation of the airfoil. An aircraft construction including a mode of attachment of the airfoils thereto is described.

---

This invention relates to bodies shaped so as to obtain a useful reaction from an air stream which moves relative to them, in particular, those bodies of cross-sectional shape which are acted upon by a large force perpendicular to the air stream direction or lift, commonly known as airfoils. Further, this invention relates to aircraft for utilizing airfoils constructed according to the principles of this invention, and the mode of attachment of said airfoils to said aircraft whereby the advantages of the airfoil constructed according to the principles of this invention may be obtained.

It is an object of this invention to provide an airfoil structure which will present more than one leading edge to the relative wind or the air velocity vector thereby producing an airfoil structure which is of at least two distinctly different aerodynamic shapes. While a given structural shape may not be alterable, it may assume more than one aerodynamic shape depending upon which edge of the structure is presented to the relative wind as a leading edge and depending on the overall structural configuration of the object. The relative wind impinges upon the airfoil at or near the leading edge so that the magnitude and direction of the lift vector thereby induced will, in the well known manner, be a function of the airfoil shape beginning at the leading edge as well as its length. In conventional airfoils the leading edge remains always just that although the airfoil or wing may be rotated to change the sweep of the leading edge or alter the area of the airfoil. In the airfoil constructed according to the principles of this invention, a change in the leading edge presented to the relative wind is accomplished by actually rotating the airfoil, which rotation takes place about an axis extending through or parallel to line extending through the surfaces of the airfoil. Thus, the airfoil constructed according to this invention will present a number of different surfaces or edges to the relative wind thereby offering the operator of an aircraft equipped with such an airfoil a variety of aerodynamic characteristics.

Another object of this invention is to provide an airfoil structure, the structural configuration of which may be altered to provide either a high lift characteristic or to provide maximum cruising efficiency.

A further object of this invention is to provide an airfoil structure which will meet the foregoing objects and which may be rotated in the above-described manner by a change in attitude of the aircraft to which the airfoil is attached. This object may be obtained in an airfoil constructed according to the principles of this invention in which the airfoil is curved from tip to tip along its entire length so that it presents a profile, forwardly or rearwardly in level flight, of a downwardly opening arc. In addition, it is an object of this invention to produce an airfoil structure of this type in which the average dihedral angle may be varied, and this object is obtained in the airfoil constructed according to this invention by hinging the airfoil at various points along its length, the hinging axis being substantially parallel to the geometric chord of the airfoil, thereby altering the curvature of the airfoil.

Still another object of this invention is to provide an airfoil which will present different leading edges to the relative wind by means of mechanical rotation of the airfoil in a substantially horizontal plane. This object is obtained in the airfoil constructed according to this invention by connecting the airfoil to the remainder of the aircraft only through the airfoil's axis of rotation. Thus, the rotation of the airfoil will not be impeded by any other structural members on the aircraft.

An additional object of this invention is to provide an aircraft construction with which the airfoil constructed according to the principles of this invention may be advantageously utilized. In particular, an aircraft construction and mode of attachment of the airfoil constructed according to this invention are provided which will allow the airfoil to be rotated, as described hereinbelow, unimpeded by other structural members of the aircraft.

The invention may be best understood by reference to the descriptions of the preferred embodiments given hereinbelow in conjunction with the drawings in which:

FIG. 1b is a fragmentary right side elevation of the aircraft illustrated in FIG. 1a;

FIG. 1c is a fragmentary bottom elevation of the left airfoil construction of the aircraft illustrated in FIG. 1a;

FIG. 3a is a front elevation of an aircraft constructed to accommodate and having mounted thereon a second preferred embodiment of the airfoils constructed according to the principles of this invention in which the airfoils are mechanically rotatable in a horizontal plane to present different leading edges to the relative wind;

FIG. 3b is a top elevation of the aircraft and airfoils illustrated in FIG. 3a;

FIG. 3c is a left side elevation of the aircraft and airfoil illustrated in FIG. 3a;

Figure 4B:
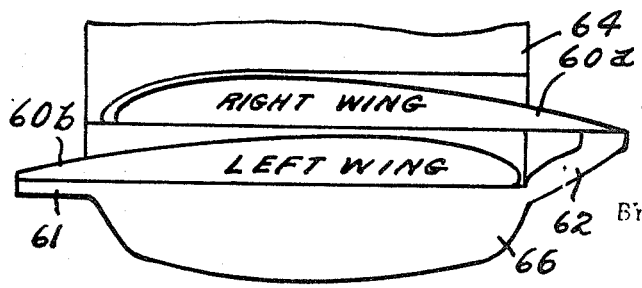
FIG. 4a is a fragmentary top elevation of an aircraft constructed to accommodate and having mounted thereon a third preferred embodiment of the aircraft constructed according to the principles of this invention showing only the right airfoil.

FIG. 4b is a sectioned rear elevation of the aircraft and airfoils illustrated in FIG. 4a in which the right and left airfoils are shown as being rotated inwardly of the fuselage; and FIG. 5 is a fragmentary top elevation of an aircraft constructed to accommodate and having mounted thereon a fourth preferred embodiment of the airfoil constructed according to the principles of this invention, said fourth embodiment being an alternative form of said third embodiment.

In the figures of the drawing and the description hereinbelow, portions of the described aircraft are preferred to as being "right" or "left" sides. These positional references are intended to be with reference to one facing in the direction of flight of the aircraft and are used for descriptive purposes only. The placement of an airfoil in one of the described positions hereinbelow is intended to be only illustrative and in no way limiting.

In the first preferred embodiment of the airfoil constructed according to the principles of this invention, the airfoil takes a shape which is curved from tip to tip. A pair of airfoils constructed in this manner may be placed on either side of an aircraft fuselage, a single such airfoil may be placed over the fuselage, such as in a single engine aircraft, or in either of the two latter arrangements a plurality of such airfoils may be aligned longitudinally of the aircraft for obtaining enhanced lift characteristics.

Figure 1A:
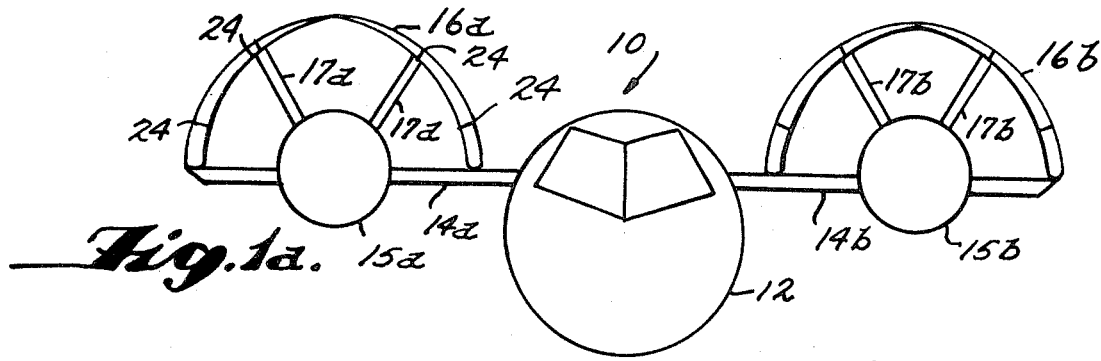
FIG. 1a is a front elevation of an aircraft having mounted thereon a first preferred embodiment of the airfoils constructed according to the principles of this invention in which the airfoils are constructed to present different leading edges to the relative wind by means of a change in attitude of the aircraft.

In FIG. 1a is shown a twin engine aircraft 10 having a fuselage 12 and wing spars 14a and 14b to which are attached engines 15a and 15b, respectively, and the airfoils 16a and 16b, respectively, constructed according to the principles of this invention. In this figure the engines are shown without propellers for purposes of clarity. It will be noted that the airfoils 16a and 16b, when viewed from directly in front of the aircraft present a profile of a downwardly opening arc. The ends of the airfoils 16a and 16b are fixedly attached by struts 17a and 17b, respectively, to the enclosures of engines 15a and 15b, respectively.

Figure 1C:
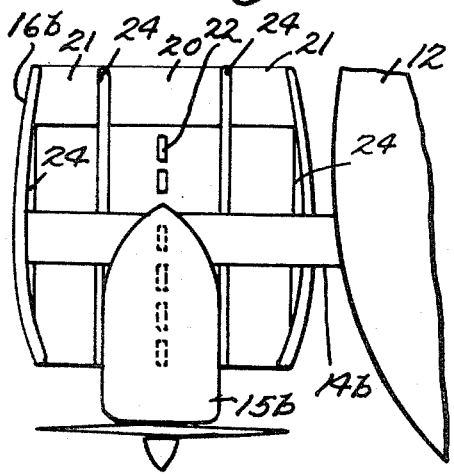
Figure 1B:
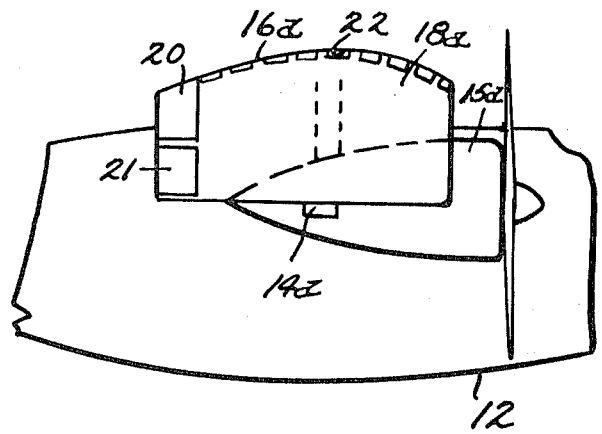

FIG. 1b, a partial view of the starboard side of the aircraft in FIG. 1a, and in which like numbers refer to like elements illustrates the longitudinal shape of the airfoils 16. The basic shape of airfoils 16 is that of one half or less of a hollow cylinder sectioned longitudinally. The upper surface 18a of airfoil 16a is shown as having simple curving sides, but it may have compound curving sides in order to achieve the desired aerodynamic shape. The trailing edge of the airfoils 16 are equipped with ailerons 20 and flaps 21, and any desired configuration of these components may be used to achieve the desired aerodynamic characteristic. A plurality of apertures 22 are provided on the upper portion of the surface of the airfoils 16 in order to provide venting of the air pressure built up within the underside of the airfoils. The number of these apertures used and their exact placement will be a function of the particular configuration used, and these matters will be obvious to those skilled in the art.

FIG. 1c is a bottom elevation of a portion of the aircraft in FIG. 1a showing the structural arrangement of the airfoil 16b with the fuselage 12 and spar 14b. The airfoil 16b in this view is fixedly attached to struts 17b which are not shown in this figure. It is in this figure that hinges 24 extending longitudinally of the surface of the airfoil with the pivotal axes thereof substantially parallel to the geometric chord are best shown. The use of these hinges 24 allows the operator of the aircraft, by suitable control and motor means (not shown), to alter the curvature at one or several places along the length of the airfoil thereby effecting a change in the lift characteristic by changing the average dihedral angle of the airfoil.

Figure 2:
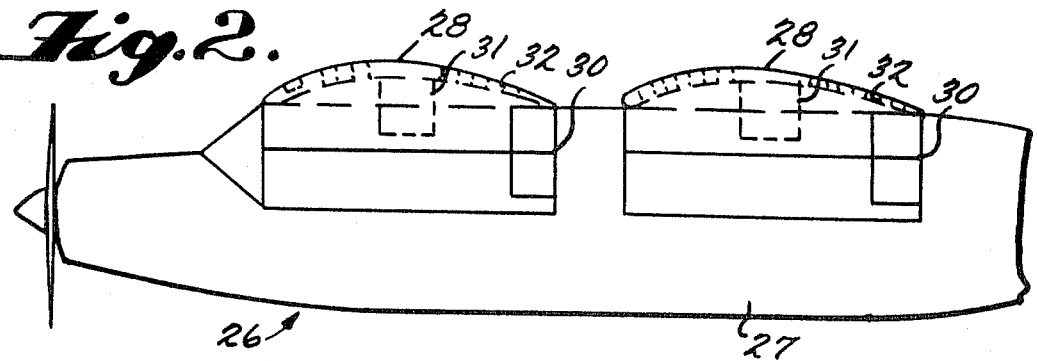
FIG. 2 is an alternative form of an aircraft designed to accommodate the first preferred embodiment of the airfoil illustrated in FIGS. 1a–1c in which the airfoils are placed in longitudinal alignment over the fuselage of a single engine aircraft.

FIG. 2 illustrates an embodiment of a single engine aircraft 26 in which the airfoils 28 are constructed as in FIGS. 1a–c and are placed over a fuselage 27 rather than beside it. In so placing the airfoils either a single airfoil 28 or a plurality of them may be used, said plurality being aligned longitudinally of the fuselage 27 depending on the lift characteristics desired. In the illustrated embodiment, a pair of airfoils 28 are arranged longitudinally along the length of the fuselage 27. The airfoils 28 are supported from the fuselage by struts 31. The airfoils 28 are provided with vents 32 for the purpose described above.

A principal advantage of the construction of the airfoil as shown in FIGS. 1a–c and 2 is that it provides a very high lift at low speeds by permitting angles of attack which would cause conventional wing structures of the same area and volume to stall. A reason that greater angles of attack are possible with the airfoil constructed as above is that its shape will cause the direction of the relative wind to shift from substantially parallel to the geometric chord of the airfoil outwardly toward a wing tip as the attitude of the aircraft is altered. Therefore, a change in attitude of the aircraft, changing the angle of attack, will result in an effective rotation of the airfoil thereby changing the leading edge which is presented to the relative wind and changing the aerodynamic shape of the airfoil. Since lift is substantially perpendicular to the relative wind, this controllable change in the direction of relative wind over an airfoil having two very different lifting qualities, depending on the axis involved, will give the aircraft operator a theoretically infinite number of airfoil combinations. It is contemplated that in certain applications the airfoil constructed as hereinabove would permit angles of attack of over 45°.

A second reason that the foil as constructed in FIGS. 1a–c and 2 will permit a much greater angle of attack and more lift is that such an airfoil creates a much larger area of more static, high pressure air on its underside than will be found in conventional airfoil structures. It is axiomatic that lift tends to be enhanced by slower, higher pressure air under the wing while higher speed air at this point creates turbulence and a loss of lift.

In the embodiment shown in FIGS. 3a–c in which like numerals refer to like elements, the aforementioned advantages are accomplished in an airfoil structures which is mechanically rotated in order to change the leading edge presented to the relative wind.

In FIG. 3a a twin engine aircraft is shown with a fuselage 42 having engines 44a and 44b extending laterally therefrom on either side of the fuselage on engine spars 41 and 41b, respectively. Extending laterally from the fuselage 42 as well are an oppositely directed pair of wing spars 46a and 46b upon which are rotatably mounted airfoils 48a and 48b, constructed according to the principles of this invention. It is to be noted that the airfoil 48a acting as the right wing presents a different aerodynamic shape to the relative wind than does the airfoil 48b acting as the left wing. This arrangement is shown for the purpose of illustrating the two different flight characteristics which may be achieved in this embodiment by using the airfoil constructed according to the principles of this invention, and it will be remembered that under normal circumstances, the two airfoils will present the same aerodynamic shape to the relative wind. The airfoils 48a and 48b are rotatably mounted on the wing spars 46a and 46b so that they may be rotated upon command by the pilot through an angle of 90°; the wing spars in addition to containing the mechanical rotating means of any conventional variety may also contain electric, fuel or hydraulic lines as necessary. The lines indicated as 47 in the wing spars 46 generally indicate such elements.

In the top elevation of FIG. 3b it can be seen that the airfoils 48a and 48b are each equipped with ailerons 50 and flaps 52 on two of the four edges thereof. The right wing or airfoil 48a is adapted to be rotated counterclockwise through an angle of 90° about an axis 54a to change the old leading edge 49a, which is the high lift, slow flight leading edge, to the wing root, and the old wing tip 49b in the latter flight aspect becomes the new leading edge which will present a speed flight aspect to the relative wind. Of course, the airfoil 48a will be rotated through a 90° angle clockwise in order to revert back to the original configuration. In the case of the left wing, it is shown as having an original position with the speed flight aspect or thinner leading edge 49b forward and is adapted to be rotated through a 90° angle counterclockwise about an axis 54b to present the high lift, low speed leading edge 49a to the relative wind. When the low speed, high lift leading edge 49a has been presented to the relative wind, the left wing or airfoil 48b may be rotated back through a 90° clockwise angle in order to return to the speed flight aspect.

FIG. 3c illustrates a side elevation of this preferred embodiment aircraft with the left wing or airfoil 48b rotated into the slow flight or high lift aspect, that is with leading edge 49a being presented to the relative wind.

In the embodiment described in FIGS. 3a–c it can be seen that the advantages set forth above with respect to the embodiment described in FIGS. 1a–c and FIG. 2 may be achieved in an airfoil constructed to be mechanically rotated about an axis extending substantially through the upper and lower airfoil surfaces. Thus, depending upon the aerodynamic shape chosen for the upper and lower surfaces of the airfoils 48 the aircraft pilot, by merely manipulating a control in the cockpit can rotate the airfoils to achieve the desired lift or flight characteristics. In this connection it must be noted that while the surfaces of the airfoil described in FIGS. 1a–c and 2 had to have a curved surface from root to tip or tip to tip in order to operate properly, it is quite possible that the embodiment shown in FIGS. 3a–c could utilize a substantially flat surface while achieving the objects of this invention.

It will be noted that in FIGS. 3a–c the airfoils 48 are not attached to the aircraft at any other point than through the axes of rotation 54 or the points at which the airfoils 48 are connected to wing spars 46. Thus, there is no structure which will impede the movement of the airfoils when rotated and in addition this will make the aircraft constructed according to the principles of this invention simple to construction and easy to maintain.

FIGS. 4a and 4b illustrate a third embodiment of the airfoil along with the aircraft constructed according to the principles of this invention in which the air foils are mechanically rotated to present different leading edges to the relative wind. In these figures like numerals refer to like elements.

In FIG. 4a is shown a top elevation of a portion of an aircraft utilizing a third embodiment of an airfoil constructed according to the principles of this invention. In this figure, the top half of the fuselage has been removed in order to clearly illustrate the mode of attachment of the airfoils to the airframe. In this figure only the right wing or airfoil 60a is shown in full view while the left airfoil 60b is only partially shown. In this figure the aircraft has attached to and extending through fuselage 64 an airframe main spar 66. Main spar 66 extends laterally from the sides of the fuselage 64 and attached to the outboard ends thereof are airfoil spars 65a and 65b to which are attached and which support the right and left airfoils 60a and 60b, respectively. It will be noted that the right end of main spar 66 includes a section 62 which not only extends laterally outwardly of the fuselage 64 but extends upwardly as well; this feature is best shown in FIG. 4b. The left end 61 of main spar 66 extends only laterally outwardly of fuselage 64. Thus, the relative vertical positions of the right and left wings are such that the right wing 60a is slightly higher vertically than the left wing 60b. The purpose for this will become clear from the discussion hereinbelow.

The right airfoil or wing 60a is shown in FIG. 4a in full line in its extended position, or the position which achieves the maximum lift at slower flight speeds. The trailing edge 70 is equipped with an aileron 71 and flap 72, but it will be remembered that this configuration may be altered within the scope of this invention to achieve the desired flight characteristics.

In order to achieve the maximum flight speed, the airfoils may be rotated inwardly of the fuselage so that they will assume an interleaved position as best shown in FIG. 4b which is a fragmentary rear elevation showing only the portion of the fuselage supporting the airfoils. In this figure it may be seen that the right wing or airfoil 60a is above the left wing or airfoil 60b, this positioning being made possible by the upwardly extending portion 62 of main spar 66. Looking only for the moment at right wing or airfoil 60a in FIG. 4a it may be noted that this airfoil may be rotated 90° in a counterclockwise direction to assume the position shown in dotted line in this figure so that the major portion of the airfoil surface area is hidden from the relative wind. That section which is exposed, which is also indiacted as 60a, will produce the maximum flight speed because of the major reduction in surface area thereby producing a major reduction in drag. Further, when the right airfoil 60a is rotated through the 90° counterclockwise angle, the relatively "fat" high lift leading edge 74 is hidden from the relative wind as well, and a portion of the relatively thin wing tip 76 is exposed to the relative wind as a leading edge. Thus, not only has the drag been materially reduced by a major reduction in airfoil surface area, but the shape of the leading edge has been changed as well to achieve a maximum speed flight characteristic. Of course, the airfoil may be rotated in a 90° clockwise direction in order to bring out the high lift characteristics again, as desired. In the case of the left wing or airfoil 60b the direction of rotation of the airfoil will be opposite to that of airfoil 60a, but the same results may be achieved.

It will be noted in this embodiment that the axes of rotation 78a and 78b of the airfoils 60a and 60b, respectively, are each external of both the airfoil associated therewith and the remainder of the aircraft structure. A knowledge of simple geometry will reveal that the placement of the axis of rotation of the airfoil in the horizontal plane will determine the amount of airfoil area which may be hidden from the relative wind. Thus, if for example, the length of the main spar 66 was much greater, the axis of rotation of the airfoil would be displaced laterally outwardly, and a proportional reduction in the amount of airfoil hidden from the relative wind upon rotation of the airfoil inwardly would occur.

FIG. 5 illustrates an embodiment similar to that shown in FIGS. 4a and 4b but in which the shape of the airfoil is such that it is not necessary to provide for interleaving of the right and left airfoils upon rotation inwardly. Again, this is a top elevation view showing only the right portion of the aircraft. In this view again a main spar 80 extends laterally outwardly from a fuselage 82 and has attached to its respective ends airfoil spars 84a and 84b. The airfoil spars 84a and 84b are attached to and support the airfoils or wings 86a and 86b, respectively.

In the view of the airfoil 86a shown in full line, it is in a position such that maximum area is exposed to the relative wind producing a high lift, slow speed flight characteristic. Further, the leading edge 88 is shaped to achieve this high lift characteristic as well. As was the case in the FIG. 4 embodiment, the airfoil may be rotated inwardly, or in the case of the right wing 86a, rotated 90° counterclockwise to expose the former trailing edge 90 as the new leading edge. This position is shown in dotted line in the figure. Thus, for maximum cruising efficiency the "fat" high lift, but high drag, leading edge 88 used for taking off and landing can be hidden in the body of the airplane and a new leading edge 90 exposed which is thinner, producing a maximum speed characteristic.

Again, it is to be noted that both edges 90 and 96, which are exposed as trailing edges depending on the orientation of the airfoil, may be equipped with ailerons 89 and flaps 91. The number of such elements used and their configuration will depend upon the particular flight characteristics desired.

The airfoil spars 84 are not rigidly attached to the remainder of the aircraft except at the axes of rotation 92, or at the points at which the airfoil spars 84 are rotatably attached to the main spar 80. The location of the axes of rotation, determined by the length of the main spar or the airfoil spars or both may be relocated in order to vary the amount of wing surface exposed to the relative wind when the airfoil is rotated inwardly. In this FIG. 5 embodiment, the axes of rotation coincide with a vertical line extending through the upper and lower surfaces of the airfoils, but they may be moved outwardly to be entirely external of the aircraft as in FIGS. 4a and 4b, depending on the amount of change in exposed area desired.

The above described preferred embodiments are intended to be only exemplary of the principles of this invention, and it will be apparent for those skilled in the art that many modifications can be made to these preferred embodiments within the scope of the appended claims. In particular it is to be noted that the number of airfoils used can be varied as well as can their placement with respect to the remainder of the aircraft.

What is claimed is:

1. An airfoil comprising upper and lower surfaces laterally bounded and joined by a continuous edge, said edge defining the perimeter of said surfaces and thereby defining the perimeter of said airfoil, said continuous edge being comprised of a plurality of edge portions, each of said edge portions facing a different direction,
    said airfoil being adapted to be rotated about an axis parallel to a line extending through said surfaces as to present different ones of said edge portions to the relative wind as a leading edge;
    said airfoil being adapted to be rotated to present different ones of said edge portions to the relative wind as a leading edge by a change in attitude of said airfoil with respect to the relative wind;
    said surfaces being curved along their lengths so that said airfoil presents downwardly opening arcuate forward and rearward profiles in level flight.

2. The airfoil defined in claim 1 comprising in addition hinging means mounted therein so that portions of said airfoil may be pivoted about an axis substantially parallel to the axis of curvature of said surfaces thereby altering the curvature of said airfoil and altering the average dihedral angle of said airfoil.

3. An airfoil comprising upper and lower surfaces laterally bounded and joined by a continuous edge, said edge defining the perimeter of said surfaces and thereby defining the perimeter of said airfoil, said continuous edge being comprised of a plurality of edge portions, each of said edge portions facing a different direction,
    said airfoil being adapted to be rotated about an axis parallel to a line extending through said surfaces as to alternatively present each of a plurality of different ones of said edge portions spaced less than 180 degrees from adjacent ones to the relative wind as a leading edge; and
    mechanical means for rotating said airfoil in a plane coplanar with the plane bounded by said continuous edge and for stopping the rotation at a plurality of angular positions with a different one of the alternative leading edges presented to the relative wind at each respective angular position;
    there being means defining control surfaces at other edge portions of said continuous edge, opposite said alternative leading edges.

4. An airfoil comprising upper and lower surfaces laterally bounded and joined by a continuous edge, said edge defining the perimeter of said surfaces and thereby defining the perimeter of said airfoil, said continuous edge being comprised of a plurality of edge portions, each of said edge portions facing a different direction,
    said airfoil being adapted to be rotated about an axis parallel to a line extending through said surfaces as to present different ones of said edge portions to the relative wind as a leading edge;
    the curvature from first one of said edge portions being adapted to produce a high lift, slow flight characteristic;
    the curvature from a second one of said edge portions being adapted to produce a maximum flight speed characteristic.

5. The airfoil defined in claim 4 wherein the rotation of said airfoil presents one of said first and second edge portions to the relative wind as a leading edge, a first of said two edge portions being of a length relatively greater than said second of two edge portions, the area of said airfoil surfaces exposed to the relative wind being relatively greater when said first edge is presented as a leading edge than when said second edge is presented as a leading edge.

6. The airfoil defined in claim 5 wherein the axis of rotation of said airfoil is external thereof but parallel to a substantially vertical line extending through said upper and lower surfaces.

7. The airfoil defined in claim 5 wherein the axis of rotation of said airfoil is within said continuous edge and coincides with a substantially vertical line extending through said upper and lower surfaces.

8. An aircraft comprising a fuselage,
    at least one airfoil comprising upper and lower surfaces laterally bounded and joined by a continuous edge, said edge being comprised of a plurality of edge portions, each of said portions facing a different direction, said continuous edge defining the perimeter of said airfoil,
    said airfoil being adapted to be rotated about an axis extending through said upper and lower surfaces as to present different ones of said edge portions to the relative wind as a leading edge, and
    means for rotatably attaching said airfoil to said fuselage,
    said airfoil surfaces being curved from wing tip to wing tip along their length so that said airfoil presents downwardly curving arcuate forward and rearward profiles in level flight, said airfoils being fixedly attached to said fuselage and adapted to be rotated to present different ones of said edge portions to the relative wind as leading edges by a change in attitude of said aircraft.

9. The aircraft defined in claim 8 having at least a pair of said airfoils, one of said airfoils being placed on each side of said fuselage.

10. The aircraft defined in claim 8 having at least one of said airfoils placed in a position over said fuselage of said aircraft.

11. An aircraft comprising a fuselage,
    at least one airfoil comprising upper and lower surfaces laterally bounded and joined by a continuous edge, said edge being comprised of a plurality of edge portions, each of said portions facing a different direction, said continuous edge defining the perimeter of said airfoil,
    said airfoil being adapted to be rotated about an axis extending through said upper and lower surfaces as to alternatively present each of a different ones of said edge portions spaced less than 180 degrees from adjacent ones to the relative wind as a leading edge, and
    means for rotatably attaching said airfoil to said fuselage and for stopping the rotation at a plurality of angular positions with a different one of the alternative leading edges presented to the relative wind at each respective angular position;
    there being means defining control surfaces at other edge portions of said continuous edge, opposite said alternative leading edges;
    said means attaching said airfoil to said fuselage rotatably connecting said airfoil to said fuselage at the axis of rotation of said airfoil in a plane coplanar with the plane bounded by said continuous edge, said aircraft having in addition means for mechanically rotating said airfoil.

12. The aircraft defined in claim 11 wherein the rotation of said airfoil presents one of two of said edge portions to the relative wind as a leading edge, a first of two said edge portions being of a length relatively greater than the second of two edge portions, the area of said airfoil surfaces exposed to the relative wind being relatively greater when said first edge is presented as a leading area than when said second edge is presented as a leading edge.

13. The aircraft defined in claim 12 comprising a pair of said airfoils placed on opposite sides of said fuselage and extending in opposite directions therefrom, said means for attaching being adapted to cause the portions of said airfoils not exposed to the relative wind when said second edge portion is exposed to the relative wind to assume an interleaved relationship in vertical alignment with said fuselage.

14. The aircraft defined in claim 12 wherein said means for attaching comprises a main spar attached to said fuselage and extending laterally outwardly therefrom, and airfoil spars attached to and supporting said airfoils, said airfoil spars being pivotally attached at the inboard ends thereof to the outboard ends of said main spar.

15. The aircraft defined in claim 14 wherein said inboard ends of said airfoil spars are within said continuous edge of each of said airfoils.

16. The aircraft defined in claim 14 wherein said inboard ends of said airfoil spars are without said continuous edge of each said airfoil.

References Cited

UNITED STATES PATENTS

| | | | |
|---|---|---|---|
| 2,670,155 | 2/1954 | Sahl | 244—45(X) |
| 3,135,483 | 6/1964 | Girard | 244—42(X) |
| 3,152,778 | 10/1964 | Girard | 244—46 |
| 3,261,572 | 7/1966 | Garton | 244—7(X) |
| 3,273,828 | 9/1966 | James | 244—43 |
| 3,507,464 | 4/1970 | Ragallo | 244—43 |

MILTON BUCHLER, Primary Examiner

C. A. RUTLEDGE, Assistant Examiner

U.S. Cl. X.R.

244—44